(12) United States Patent
Yasheng

(10) Patent No.: US 7,665,216 B2
(45) Date of Patent: Feb. 23, 2010

(54) SAW BLADE CLAMPING ASSEMBLY FOR RECIPROCATING SAW

(75) Inventor: Chen Yasheng, Nanjing (CN)

(73) Assignee: Nanjing Chervon Industry Co., Ltd., Nanjing, Jiangsu (CN)

( * ) Notice: Subject to any disclaimer, the term of this patent is extended or adjusted under 35 U.S.C. 154(b) by 200 days.

(21) Appl. No.: 11/637,473

(22) Filed: Dec. 12, 2006

(65) Prior Publication Data

US 2007/0131076 A1    Jun. 14, 2007

(30) Foreign Application Priority Data

Dec. 13, 2005    (CN) .................... 2005 2 0139760 U

(51) Int. Cl.
*B23D 51/10*    (2006.01)
*B27B 19/09*    (2006.01)

(52) U.S. Cl. .............................. 30/392; 30/337; 279/71

(58) Field of Classification Search .................. 30/335, 30/342, 392–394, 337–339; 83/699.21; 279/23.1, 279/29, 30, 32, 35, 36, 71, 72, 76–81, 89, 279/102
See application file for complete search history.

(56) References Cited

U.S. PATENT DOCUMENTS

| | | | | |
|---|---|---|---|---|
| 870,142 | A * | 11/1907 | Wahlstrom .................... | 279/69 |
| 4,626,146 | A * | 12/1986 | Neumaier ................ | 408/239 R |
| 4,691,929 | A * | 9/1987 | Neumaier et al. .......... | 279/19.3 |
| 5,575,071 | A * | 11/1996 | Phillips et al. ................. | 30/392 |
| 6,101,726 | A * | 8/2000 | Laverick ...................... | 30/392 |
| 6,276,065 | B1 * | 8/2001 | Osada et al. .................. | 30/392 |
| 6,554,290 | B2 * | 4/2003 | Lin .............................. | 279/72 |
| 6,638,290 | B2 * | 10/2003 | Pascaloff et al. ............ | 606/177 |
| 6,851,194 | B1 * | 2/2005 | Chen et al. ..................... | 30/392 |
| 2004/0045425 | A1 | 3/2004 | Houben et al. | |

\* cited by examiner

*Primary Examiner*—Boyer D. Ashley
*Assistant Examiner*—Edward Landrum
(74) *Attorney, Agent, or Firm*—McDermott Will & Emery LLP

(57) ABSTRACT

The present invention generally provides a saw blade clamping assembly. The assembly has a main body, a clamping device, a rotating sleeve and a biasing device. The main body has a receiving slot for receiving a fixing end of a saw blade and an oblique and elongate hole communicating with the receiving slot. The clamping device has at least one clamping member passing through the oblique and elongate hole of the main body. The rotating sleeve encloses the main body and the clamping device. The biasing device is biased between the main body and the rotating sleeve.

5 Claims, 6 Drawing Sheets

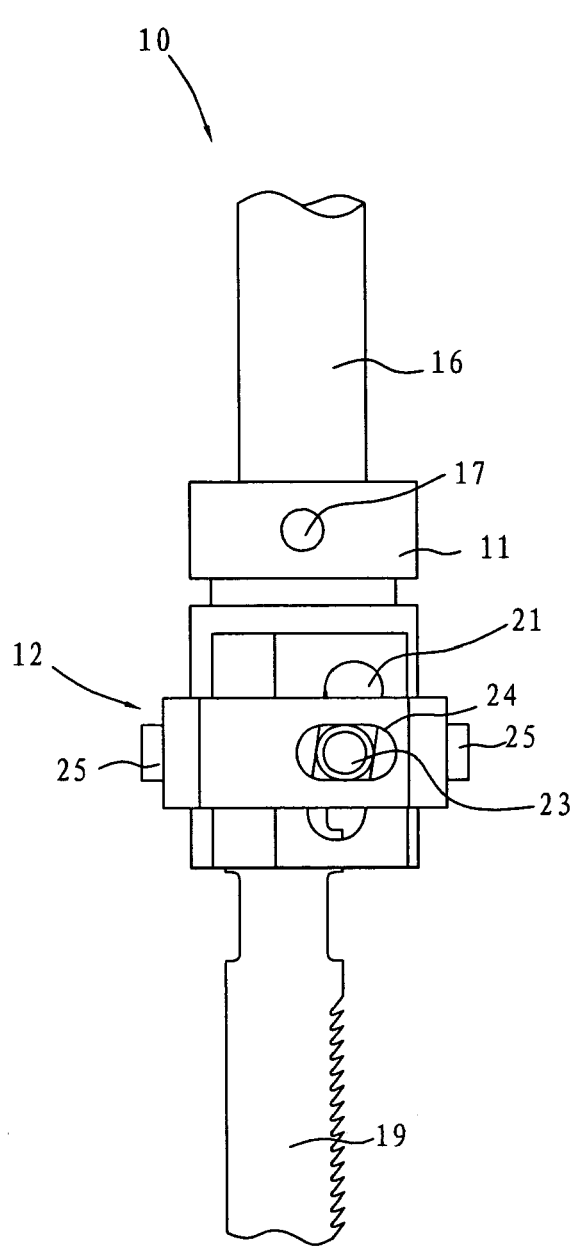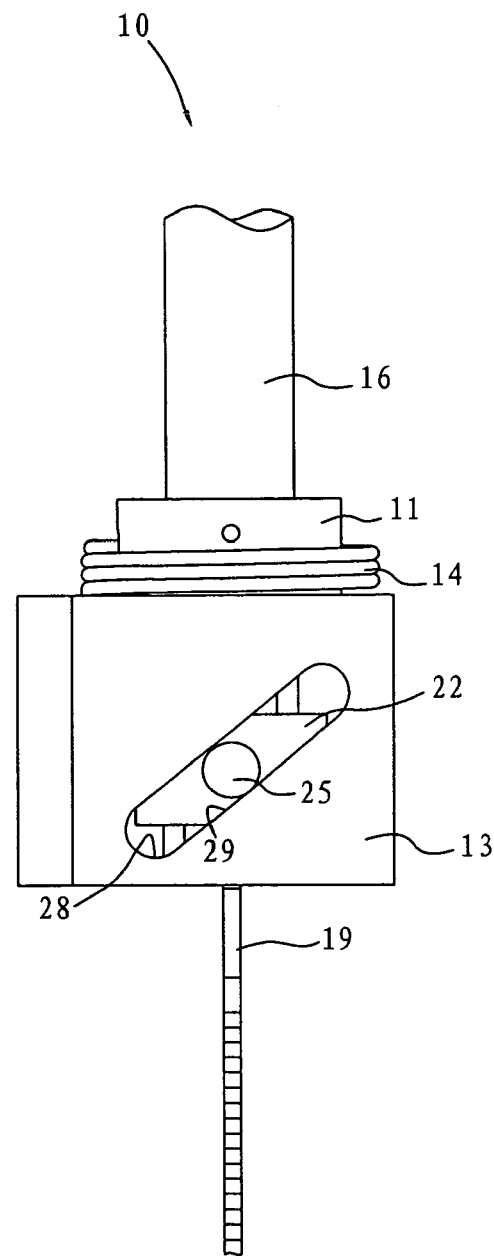
FIG 2
FIG 3

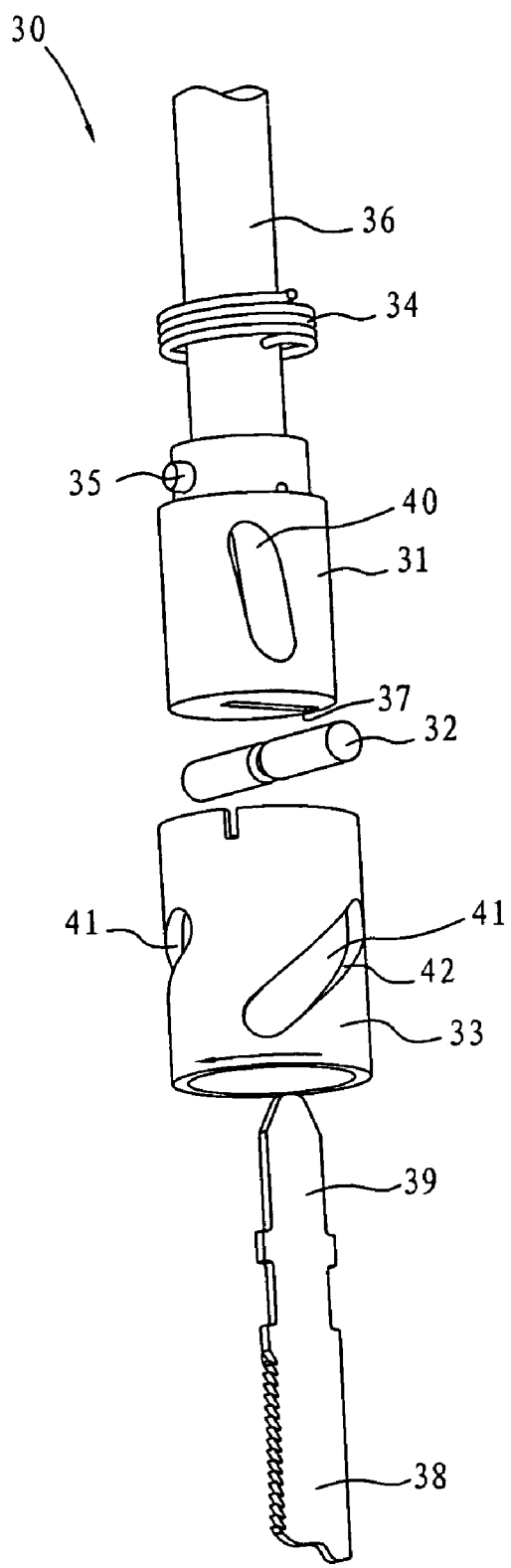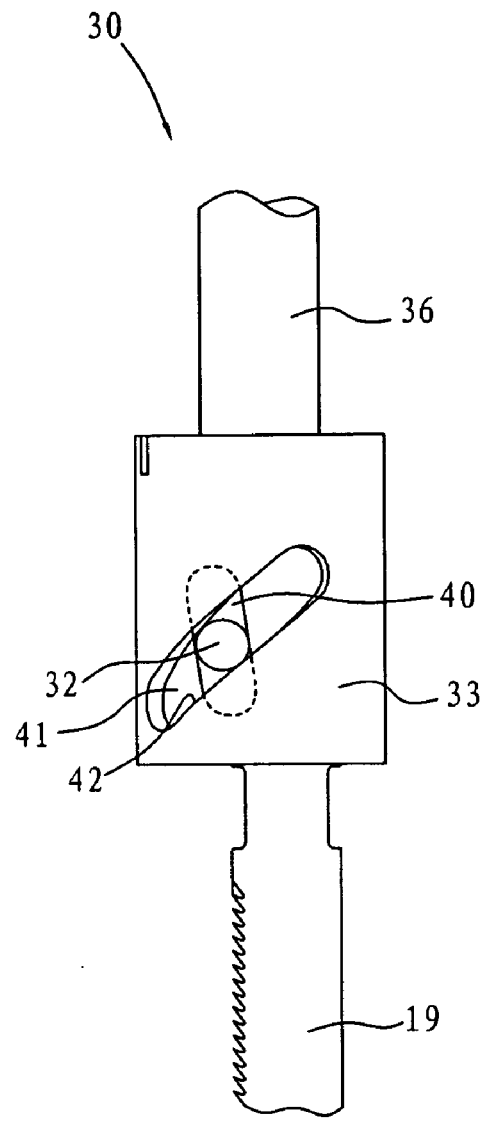
FIG 4
FIG 5

SAW BLADE CLAMPING ASSEMBLY FOR RECIPROCATING SAW

CROSS-REFERENCE TO RELATED APPLICATIONS

This application claims priority to Chinese Application No. 200520139760.7 filed Dec. 13, 2005, the entire disclosure of which is incorporated herein by reference. Priority to this application is claimed under 35 U.S.C. 119, 120 and/or 365.

TECHNICAL FIELD

The present invention relates to a saw blade clamping assembly for a reciprocating saw, and more particularly to a saw blade clamping assembly which is allowed for quick clamping and loosing of the saw blade.

BACKGROUND OF THE INVENTION

A saw blade often needs to be replaced when use a reciprocating saw for cutting. A conventional saw blade clamping assembly usually comprises a bolt which passes through a threaded hole in a main body of the clamping assembly, with the end surface of the bolt press against one side surface of the saw blade. Clamped by such a clamping assembly, the saw blade may intend to slide down during cutting due to acutely vibration, which may result in damages to the reciprocating saw and the workpiece, and even being dangerous to the operator. Additionally, when it is needed to replace the saw blade, the bolt needs to be loosed or tightened via a wrench or other similar tools. Thereby it's difficult and inconvenient to operate.

The present invention is provided to solve the problems discussed above and other problems, and to provide advantages and aspects not provided by prior saw blade clamping assemblies of this type. A full discussion of the features and advantages of the present invention is deferred to the following detailed description, which proceeds with reference to the accompanying drawing.

SUMMARY OF THE INVENTION

An object of the present invention is to provide a saw blade clamping assembly for a reciprocating saw which is safe and convenient for operating.

To obtain the above mentioned object, a saw blade clamping assembly for a reciprocating saw of the present invention comprises a main body, a clamping device, a rotating sleeve and a biasing device. The main body is fixed to a reciprocating shaft of the reciprocating saw, and comprises a receiving slot for receiving one end of a saw blade and an oblique and elongate hole communicated with the receiving slot. The clamping device further comprises at least one clamping member passes through the oblique and elongate hole. The rotating sleeve encloses the main body and the clamping device. The biasing device has a first end fixed to the main body or the reciprocating shaft, and a second end fixed to the rotating sleeve. One of the clamping device and the rotating sleeve has at least one activating surface, and the other of the clamping device and the rotating sleeve has at least one contacting surface for contacting with the activating surface.

The main body of the saw blade clamping assembly has a longitudinal axis, along with which the receiving slot extends.

When the rotating sleeve of the saw blade clamping assembly being rotated in a direction overcoming biasing force of the biasing device, the activating surface and the contacting surface press against each other, and the clamping member of the clamping device moves in the oblique and elongate hole of the main body in a direction leaves away from the saw blade.

The saw blade clamping assembly of the present invention is able to quickly fix the saw blade without any additional tool, which is convenient, and avoids unsuccessful clamping. Furthermore, no matter how the saw blade vibrates during cutting, the biasing force exerted between the main body and the rotating sleeve by the biasing device makes the clamping member fixedly press the saw blade in the receiving slot of the main body, preventing the saw blade form loosing, and making cutting operation more reliable and safer.

Other features and advantages of the invention will be apparent from the following specification taken in conjunction with the following drawing.

BRIEF DESCRIPTION OF THE DRAWINGS

To understand the present invention, it will now be described by way of example, with reference to the accompanying drawing in which:

FIG. 2 is a side view of the saw blade clamping assembly of FIG. 1 with the rotating sleeve and the biasing device being removed.

FIG. 3 is a side view of the saw blade clamping assembly of FIG. 1 being assembled with the rotating sleeve.

FIG. 4 is an exploded view of a saw blade clamping assembly according to the second embodiment of the present invention.

FIG. 5 is a side view of an assembled saw blade clamping assembly of FIG. 4.

DETAILED DESCRIPTION

Figure 1:
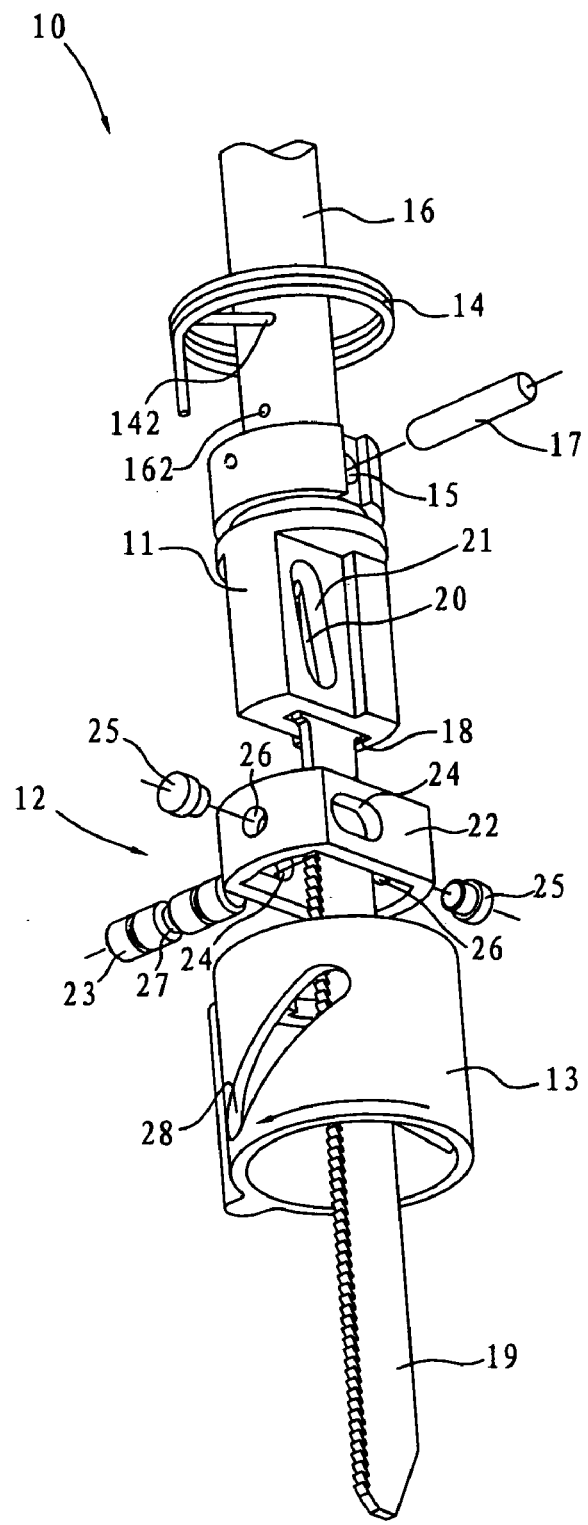
FIG. 1 is an exploded view of a saw blade clamping assembly according to the first embodiment of the present invention.
Figure 6:
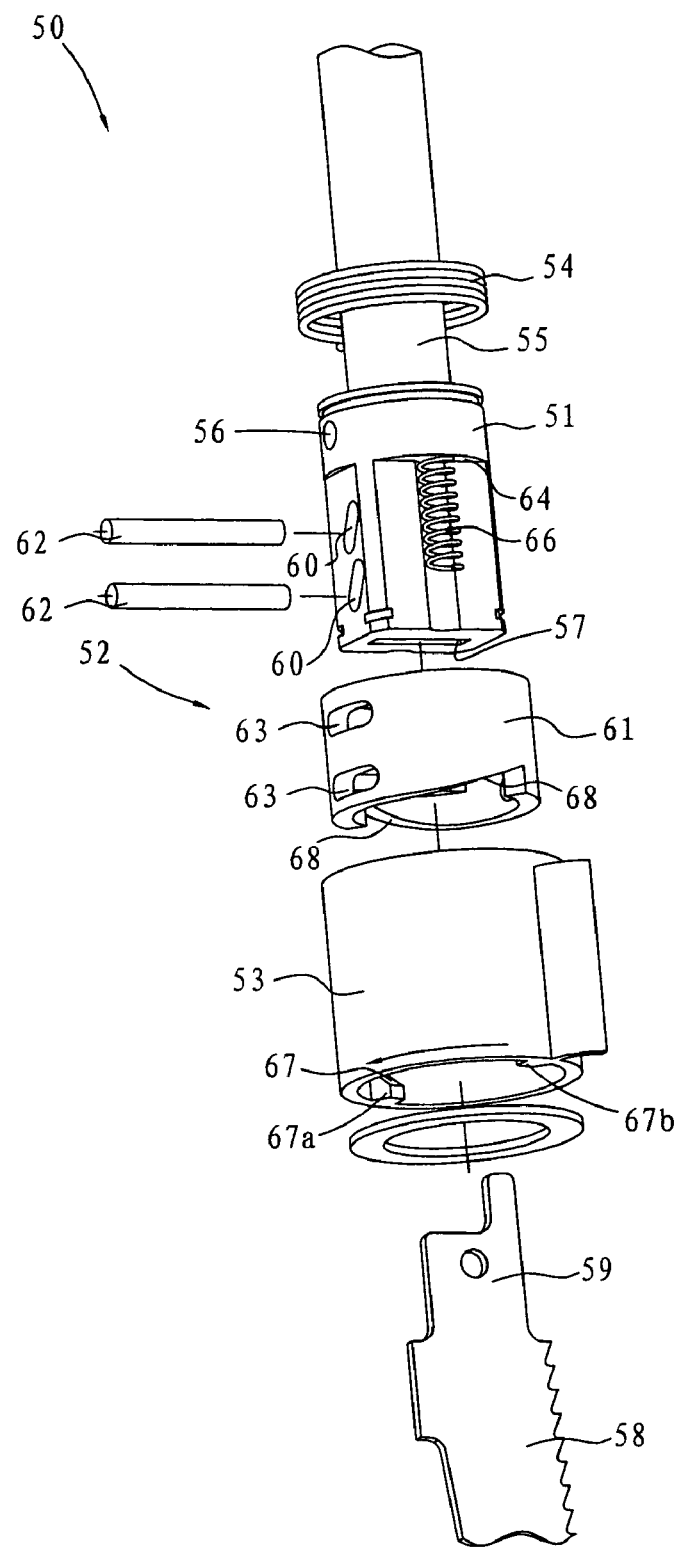
FIG. 6 is an exploded view of a saw blade clamping assembly according to the third embodiment of the present invention.
Figures 7, 8:
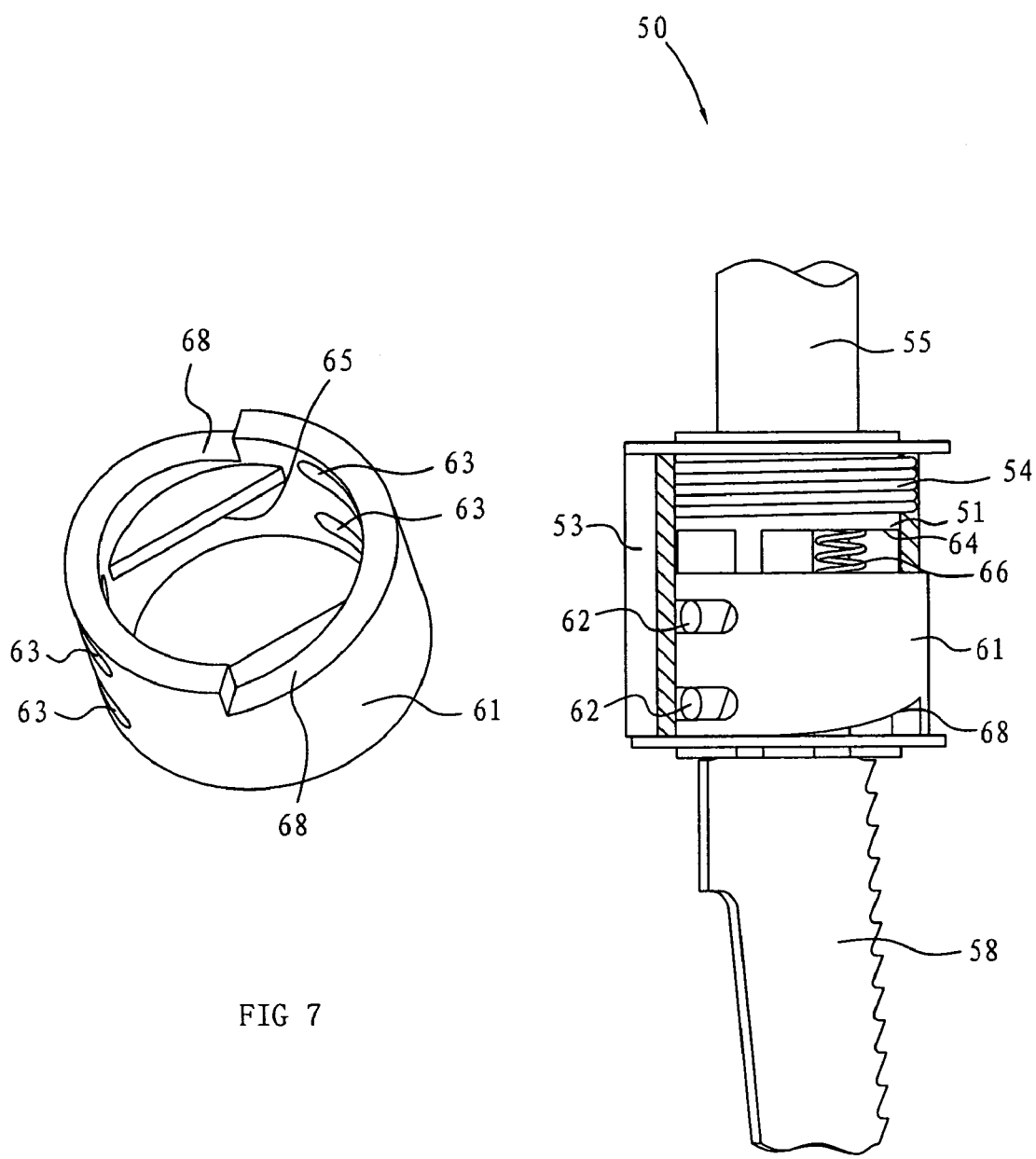
FIG. 7 is a perspective view of a bush of the saw blade clamping assembly of FIG. 6.
FIG. 8 is a side view of the saw blade clamping assembly of FIG. 6 with the rotating sleeve being partly cut away.
Figure 9:
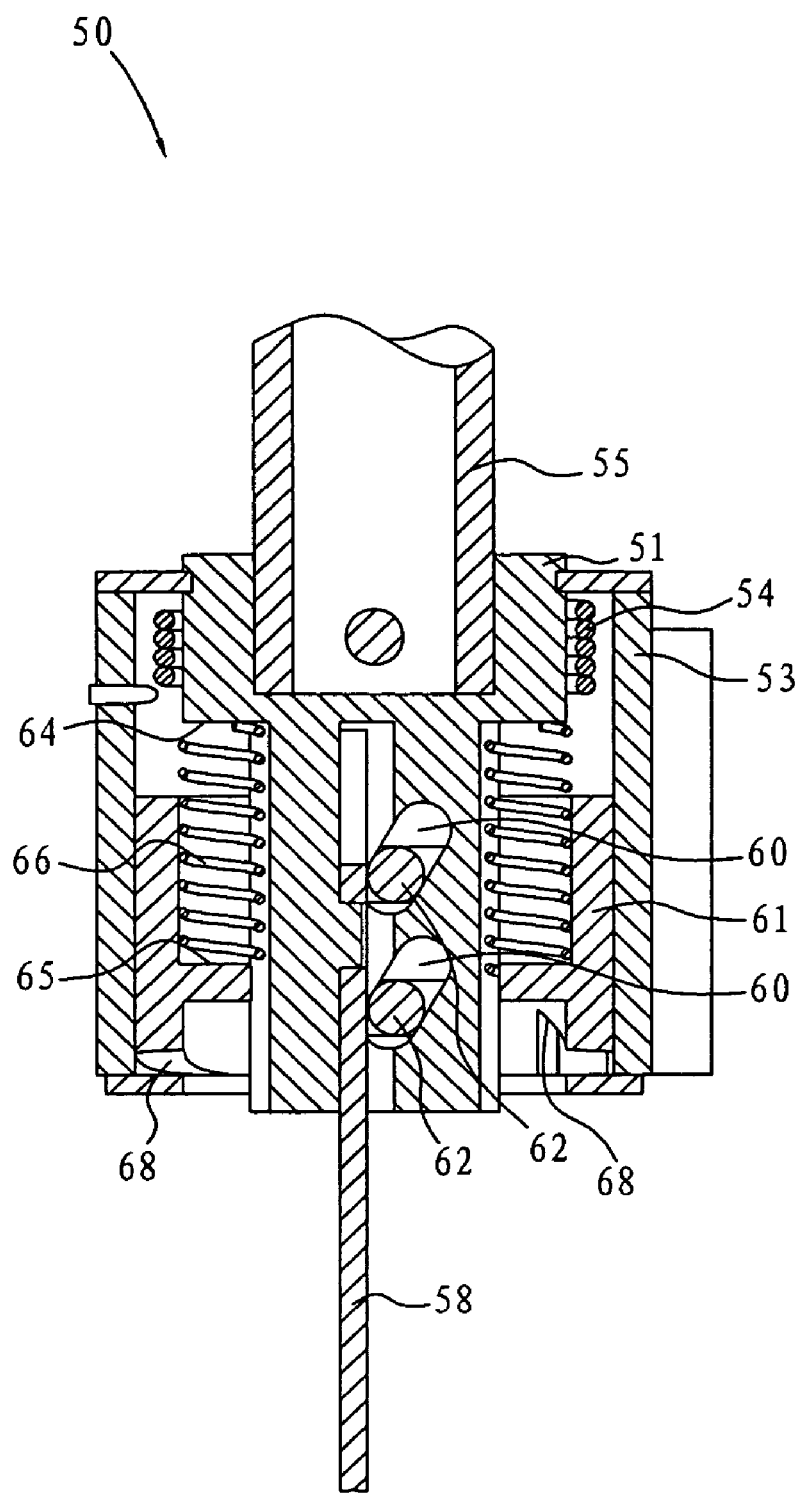
FIG. 9 is a cutaway view of the saw blade clamping assembly of FIG. 6.

While this invention is susceptible of embodiments in many different forms, there is shown in the drawing and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1 to 3, a saw blade clamping assembly 10 for a reciprocating saw according to the first embodiment of the present invention includes a main body 11, a clamping device 12, a rotating sleeve 13 and a biasing device 14. The main body 11 comprises a through hole 15 in a top portion thereof. A reciprocating rod 16 of the reciprocating saw comprises a corresponding through hole (not shown) in a bottom end thereof. The main body 10 is fixed to the bottom end of the reciprocating rod 16 by a pin 17 passing through the through hole 15 of the main body 11 and the through hole at the bottom end of the reciprocating rod 16. The main body 11 may be fixed to the bottom end of the reciprocating rod 16 via other ways, and also may be formed integrally with the reciprocating rod 16. A receiving slot 18 extends along a longitudinal axis of the main body 11 for receiving a fixing end 20 of a saw blade 19. The main body 11 further comprises a pair of oblique and elongate holes 21 communicating with the receiving slot 18 at both sides of the main body where the wider sides of the receiving slot 18 is located. The clamping device 12 includes a bush 22 and a clamping member 23. The bush 22 encloses the bottom portion of the main body 11. It is preferred that the clamping member 23 is a roller, which passes through a pair of elongated holes 24 in the bush 22 and the oblique and elongate hole 21 of the main body 11, with a middle slot 27 thereof engaging a narrow side of the saw blade 19. The elongate hole 24 of the bush 22 is perpendicular to the longitudinal axis of the main body 11. When the bush 22 moves along the longitudinal axis, the clamping member 23 is driven to move in the oblique and elongate hole 21 towards or away from the end 20 of the saw blade, thereby securing or loosening the saw blade 19, respectively. The clamping device 12 further includes a pair of pin shafts 25 which are fixed in the holes 26 at the opposite sides of the bush 22, and partially protruding from the bush 22. The rotating sleeve 13 has a pair of activating slots 28 (only one is shown) in the peripheral wall thereof. Preferably, the activating slot 28 is a helix slot or an oblique slot or the like, and whose bottom surface is an activating surface 29. The rotating sleeve 13 encloses the bush 22. The portions of the pin shafts 25 which protrude from the bush 22 are respectively fitted in the corresponding activating slots 28. It is appreciated that, the biasing device 14 is a torsion spring, one end of which is fixed to a top portion of the main body 11, and the other end of which is fixed to the rotating sleeve 13, such that a biasing force is exerted between the main body 11 and the rotating sleeve 13 which makes the clamping member 23 tend to clamp the fixing end 20 of the saw blade. It is obvious to those skilled in the art that, as an alternative, the end of the biasing device 14 which fixed to the main body 11 may be fixed to the bottom end of the reciprocating rod 16. When an operator rotates the rotating sleeve 13 in the direction as indicated by an arrow in FIG. 1, the press between the surface of the pin shaft 25 and the activating surface 29 of the activating slot 28 urges the pin shaft 25 to move upward along the activating surface 29, so that the bush 22 carries the clamping member 23 to move upward along the oblique and elongate hole 21 of the main body 11 and away from the blade 19, thereby the operator can insert or detach the saw blade 19. Thereafter if the rotating sleeve 13 is set free, the biasing force exerted between the rotating sleeve 13 and the main body 11 by the biasing device 14 makes the rotating sleeve 13 rotate around the main body 11 in a direction opposite to the direction indicated by the arrow as shown in FIG. 1, and the press between a top surface of the activating slot 28 and the pin shaft 25 urges the pin shaft to move downward along the activating slot 28, thereby the clamping member 23 is driven by the bush 22 to move obliquely downward along the oblique and elongate hole 21 of the main body 11, so as to fix the fixing end 20 of the saw blade in the receiving slot 18.

Referring to FIGS. 4 and 5, a saw blade clamping assembly 30 according to the second embodiment of the present invention includes a main body 31, a clamping device, a rotating sleeve 33 and a biasing device 34. The main body 31 is fixedly connected to a bottom end of the reciprocating rod 36 of the reciprocating saw via a pin 35. A receiving slot 37 extends along a longitudinal axis of the main body for receiving a fixing end 39 of the saw blade 38. The main body 31 further comprises a pair of oblique and elongate holes 40 communicate with the receiving slot 37. The rotating sleeve 33 has a pair of activating slots 41 on a peripheral wall thereof. Preferably, the activating slot 41 is a helix slot or an oblique slot or the like, and whose bottom surface forms an activating surface 42. The rotating sleeve 33 encloses the main body 31. The clamping device includes a clamping member 32, which is preferred to be a roller, passes through the activating slots 41 of the rotating sleeve 33 and the oblique and elongate hole 40 of the main body 31. It is preferred that, the biasing device 34 is a torsion spring, one end of which fixed to the main body 31, and the other end thereof fixed to the rotating sleeve 33, so as to exert a biasing force between the main body 31 and the rotating sleeve 33. When an operator rotates the rotating sleeve 33 in a direction as indicated by the arrow shown in FIG. 4, the press between the surface of the clamping member 32 and the activating surface 42 urges the clamping member 32 to move obliquely upward along the oblique and elongate hole 40 of the main body 31, so that the operator may insert or detach the slaw blade 38. Thereafter if the rotating sleeve 33 is set free, the biasing force exerted between the rotating sleeve 33 and the main body 31 by the biasing device 34 makes the rotating sleeve 33 rotate around the main body 31 in a direction opposite to the direction indicated by the arrow as shown in FIG. 4, and the press between a top surface of the activating slot 41 and the clamping member 32 urges the clamping member 32 to move obliquely downward along the oblique and elongate hole 40 of the main body 31, so as to fix the fixing end 39 of the saw blade in the receiving slot 37.

Referring to FIGS. 6 to 9, a saw blade clamping assembly 50 for a reciprocating saw according to the third embodiment of the present invention includes a main body 51, a clamping device 52, a rotating sleeve 53 and a biasing device 54. A top portion of the main body 51 fixedly connects to a bottom end of a reciprocating rod 55 of the reciprocating saw via a pin 56. A receiving slot 57 is defined in a bottom end of the main body 51 and extending along a longitudinal axis thereof, for receiving a fixing end 59 of a saw blade 58. The main body 51 comprises at least one oblique and elongate hole 60 communicating with the receiving slot 57 on the wall where the narrow side of the receiving slot 57 is located. Preferably, the main body 51 has a pair of oblique and elongate holes 60 parallel to each other. The clamping device 52 includes a bush 61 and two clamping members 62. The clamping members 62 are preferred rollers. The bush 61 encloses the bottom portion of the main body 51. The bush 61 further comprises two pairs of elongated holes 63 extending along a direction perpendicular to the longitudinal axis of the main body 51. Each clamping member 62 passes through a pair of elongated holes 63 of the bush 61 and one oblique and elongate hole 60 of the main body 51. At each side of the bottom portion of the main body 51 where wide sides of the receiving slot 57 are located, a positioning surface 64 is defined respectively. The bush 61 has two blocks, projected inwardly from side wall, for providing two positioning surfaces 65 corresponding to the positioning surfaces 64 of the main body 51. A compression spring 66 is biased between the positioning surfaces 64 of the main body and the positioning surface 65 of the bush. The rotating sleeve 53 encloses the bush 61. At the bottom portion of the rotating sleeve 53, two blocks 67a and 67b oppositely defined and projected inwardly from an inner surface of the rotating sleeve. Two oblique surfaces 67 (only one shown) are defined on the blocks. The bush 61 provides two symmetric activating surfaces 68 at a bottom surface thereof. In the preferred embodiment, the activating surfaces 68 are oblique and surfaces or helix surfaces or the like. The oblique surfaces 67 of the rotating sleeve 53 contact with the activating surfaces 68 of the bush 61. It is obvious to those who skilled in the art that the location of the activating surfaces 68 and the oblique and surfaces 67 may be exchanged. It is preferred that, the biasing device 54 is a torsion spring, one end of which is fixed to the main body 51, and the other end thereof is fixed to the rotating sleeve 53, so as to exert a biasing force between the main body 51 and the rotating sleeve 53. When rotate the rotating sleeve 53 in the direction as indicated by the arrow shown in FIG. 6, the press between the oblique surfaces 67 of the rotating sleeve 53 and the activating surfaces 68 of the bush 61 urges the bush 61 to move upward, so that the compression spring 66 is further compressed, and the clamping member 62 moves obliquely upward in the oblique and elongate hole 60, thereby the saw blade 58 may be freely inserted or detached. Thereafter, if the rotating sleeve 53 is set free, the biasing force exerted between the rotating sleeve 53 and the main body 31 by the biasing device 54 makes the rotating sleeve 53 automatically turn to its original position, and the bush 61 is biased to move downward by the biasing force of the compression spring 66, thereby the clamping member 62 is driven to move obliquely downward along the oblique slot 60 of the main body 51 and press against a wide side of the fixing end 59 of the saw blade, such that the saw blade is fixed in the receiving slot 57.

The forgoing discloses and describes only exemplary embodiments of the present invention for purposes of illustration, not for limiting the scope of the present invention. It is obvious to those skilled in the art that various modifications and variations can be made without departing from the scope and spirit of the present invention. The invention should only be limited as in the claims appended below.

What is claimed is:

1. A saw blade clamping assembly for a reciprocating saw having a blade, the clamping assembly comprising:
    a main body fixed to a reciprocating rod of the reciprocating saw, wherein the main body has a longitudinal axis parallel to the saw blade;
    a receiving slot defined in and extending along the longitudinal axis of the main body for receiving one end of a saw blade;
    an elongate hole defined in the main body running obliquely in a direction along the saw blade and communicating with the receiving slot;
    a rotating sleeve enclosing the main body;
    a clamping device connected between the main body and the rotating sleeve for fixing the saw blade in the receiving slot; and
    a biasing device having a first end fixed to the main body and a second end fixed to the rotating sleeve;
    wherein the clamping device includes at least one clamping member passing through the oblique and elongate hole of the main body and abutting the saw blade;
    wherein the rotating sleeve comprises at least one activating surface, the clamping device comprises at least one contacting surface for being contacted with and activated by the activating surface to move the clamping device along the longitudinal axis when the rotating sleeve is turned in a direction that opposes a biasing force produced by the biasing device thereby allowing a user to remove the saw blade.

2. The saw blade clamping assembly as claimed in claim 1, wherein when the rotating sleeve is turned in a direction that opposes the biasing force of the biasing device, the clamping member of the clamping device moves along the elongate hole of the main body in a direction away from the saw blade.

3. The saw blade clamping assembly as claimed in claim 1, wherein the clamping member is a roller positioned perpendicular to the longitudinal axis of the main body.

4. The saw blade clamping assembly as claimed in claim 1, wherein the biasing device is a torsion spring.

5. The saw blade clamping assembly as claimed in claim 1, wherein the activating surface is an oblique surface or a helix surface.

* * * * *